United States Patent [19]
Oury
[11] 4,170,291
[45] Oct. 9, 1979

[54] ARTICULATE CONVEYOR SYSTEM FOR TOWER CRANE

[75] Inventor: Robert F. Oury, Hampshire, Ill.
[73] Assignee: Rotec Industries, Elmhurst, Ill.

[21] Appl. No.: 884,188
[22] Filed: Mar. 7, 1978
[51] Int. Cl.[2] B65G 15/26
[52] U.S. Cl. 198/588; 198/594; 198/607
[58] Field of Search 198/588, 589, 594, 607, 198/536, 587; 214/15 R, 15 D, 15 E; 212/56; 417/900

[56] References Cited

U.S. PATENT DOCUMENTS

| | | | |
|---|---|---|---|
| Re. 26,347 | 2/1968 | Oury | 198/536 |
| Re. 29,110 | 1/1977 | Oury | 198/588 |
| 1,066,302 | 7/1913 | Miller | 198/594 |
| 2,309,715 | 2/1943 | Rudow | 198/588 |
| 3,198,353 | 8/1965 | McDowell | 198/588 |
| 3,250,400 | 5/1966 | Bennett | 212/56 |
| 3,417,859 | 12/1968 | Clemente | 198/536 |
| 3,878,935 | 4/1975 | Oury | 198/589 |

FOREIGN PATENT DOCUMENTS

| | | | |
|---|---|---|---|
| 1047805 | 12/1953 | France | 198/594 |
| 296694 | 3/1971 | U.S.S.R. | 198/594 |

*Primary Examiner*—Joseph E. Valenza
*Attorney, Agent, or Firm*—Allegretti, Newitt, Witcoff & McAndrews

[57] ABSTRACT

Apparatus for conveying concrete mix to distant, elevated points includes a two-segment discharge conveyor with its outer segment suspended from a movable trolley that is mounted on the boom of a cantilever crane. The segments are pivotally joined and the discharge point of the outer segment may be positioned by swinging the boom and first conveyor and driving the trolley along the boom.

5 Claims, 3 Drawing Figures

ARTICULATE CONVEYOR SYSTEM FOR TOWER CRANE

BACKGROUND OF THE INVENTION

The present invention relates to a conveyor mechanism, and more particularly, to a conveyor mechanism suspended below a boom, for delivering concrete mix to distant elevated points on a construction project.

Disclosed in U.S. Pat. No. 3,878,935, issued to the present inventor, is a highly useful apparatus for delivering concrete mix to distant, elevated points. That apparatus includes a discharge conveyor suspended below a boom. As preferred therein, the discharge conveyor has a single two-hundred-fifty foot segment that swings with the boom. To provide for discharge of the concrete mix at points short of the extreme end of the discharge conveyor, a side disharge plow that is movable along the discharge conveyor is mounted thereon.

Through experience, it has been discovered that this apparatus has certain limitations. Most importantly, because the discharge conveyor has an unbroken length of two-hundred-fifty feet, obstructions found at some construction projects interfere with the positioning of the discharge conveyor. Since the concrete mix cannot be dropped from great height without separation of the aggregate, the discharge conveyor cannot be simply raised to clear the obstructions. Thus, some points near an obstruction are inaccessible. Also, the apparatus requires a truss support member to prevent lateral bending of the discharge conveyor which adds weight to the apparatus necessitating the use of large cranes. The apparatus also preferably requires the inclusion of a side discharge plow that trasverses the length of the discharge conveyor, and multiple support cables for supporting the discharge conveyor.

SUMMARY OF THE INVENTION

It is thus an object of the present invention to provide an improved apparatus for conveying a flowable semifluid mass such as concrete mix to points to high elevation without the limitations of prior art devices.

Another object of this invention is to provide an apparatus for conveying concrete mix, the discharge conveyor of which will not interfere with obstructions at the construction site and provide a greater arc of use.

Another object of this invention is to provide an apparatus for conveying concrete mix wherein the full capabilities of a cantilever crane having a pivotable boom and a rail mounted trolley are utilized.

A further object of this invention is to provide an apparaus for conveying concrete mix wherein a crane provides the placing functions.

A further object of the present invention is to provide an apparatus for placing concrete which eliminates the need for a side discharge plow.

A still further object of the present invention is to provide an apparatus for conveying concrete mix having a lighter-weight discharge conveyor structure.

Yet another object of the present invention is to provide an apparatus for conveying concrete mix having a simplified cable suspension.

Therefore, in a principal aspect, the present invention is an apparatus for conveying a flowable semi-fluid mass to a distant point which includes a first elongated and substantially upright support member; a second elongated and outwardly extending support member having a first end section and a second end section; first pivot means for pivotally connecting said first end section of said second member to said first support member for pivoting about at least a substantially vertical axis; elongated and articulated discharge conveyor means for conveying said flowable semi-fluid mass to said distant point, said conveyor means having a first conveyor means segment, a second conveyor means segment and second pivot means for pivotally connecting said first conveyor means segment to said second conveyor means segment for pivoting about at least a substantially vertical axis, said second conveyor means segment having an end section and a discharge point thereon; third pivot means for pivotally connecting said first conveyor means segment to said first support member for pivoting about at least a substantially vertical axis; first means for supporting said first conveyor means segment from said first support member; second means for supporting said second conveyor means segment; and means for movably mounting said second support means to said second support member for linear movement thereof along at least said second end section thereof, whereby said distant point may be varied by pivoting said second support member and by moving said movable mounting means to position said discharge point.

Other objects and advantages of the present invention will be found in the detailed description of the preferred embodiment, which follows.

BRIEF DESCRIPTION OF THE DRAWING

The preferred embodiment of this invention is illustrated in the accompanying drawing wherein.

DETAILED DESCRIPTION OF THE PREFERRED EMBODIMENT

Figure 1:
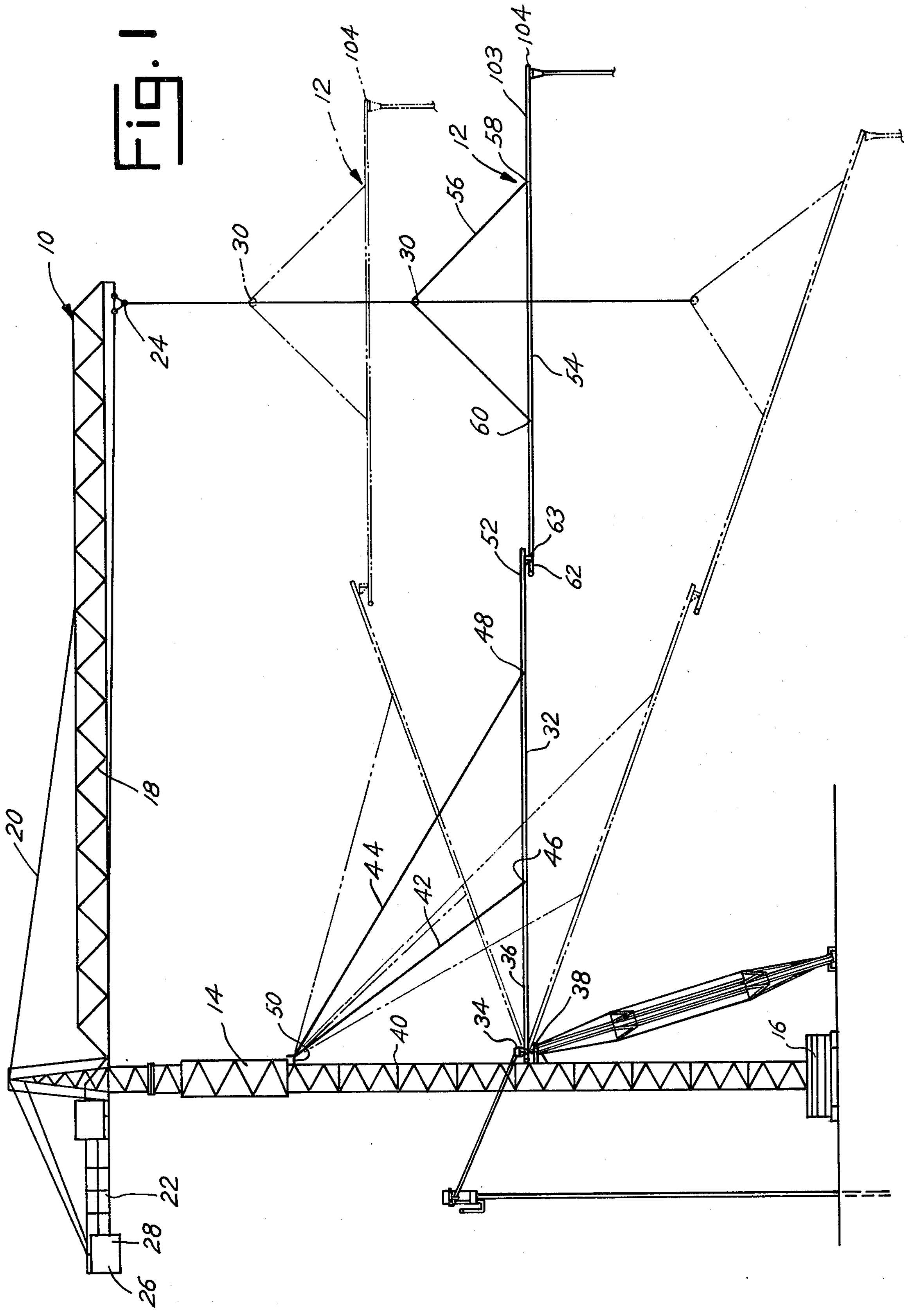
FIG. 1 is an overall side view of the preferred embodiment of the present invention.

Referring to FIG. 1, the preferred embodiment of the present invention includes a cantilever crane 10 having suspended therefrom an articulated discharge conveyor 12.

Crane 10 has a generally vertical tower 14 set atop a platform 16. An outwardly extending jib boom 18 is rotatably mounted atop the tower 14. The jib boom 18 is supported by jib boom support cables 20, and is counter-balanced by a backward extension 22 of the jib boom 18. Mounted on rails for travel along the underside of the jib boom 18 is a trolley 24. A main support cable 30 is slidably mounted on the trolley 24. A trolley drive mechanism 26 and a hoist drive mechanism 28 mounted on the backward extension 22 drive the trolley 24 and hoist the main support cable 30, respectively.

A first or inner discharge conveyor segment 32 having an endless conveyor belt (not shown) is mounted on and supported by the tower 14. A pivot 34 pivotally connects the supply end 36 of the conveyor segment 32 at a fixed point 38 along an inner face 40 of the tower 14. Two spaced, slanting cables 42,44 are attached at their ends to points 46,48 along the conveyor segment 32. At their other ends, cables 42,44 are attached to a trunnion 50 on tower 14. To facilitate rotation of the conveyor segment 32, trunnion 50 is positioned directly above the pivot 34.

Supported by the main support cable 30 and connected to the discharge end 52 of the inner discharge segment 32 is a second or outer discharge conveyor segment 54 having an endless belt (not shown). As shown in FIG. 1, a secondary support cable 56 is attached at fixed points 58,60 spaced along the conveyor segment 54. The main support cable 30 is slidably attached to the secondary support cable 56 away from the ends thereof. The conveyor segment 32 has its discharge end 52 attached to and overlying the supply end 62 of the conveyor segment 54. Concrete mix conveyed along the conveyor segment 32 is thus transferred to the conveyor segment 54.

A transfer apparatus 63 provides for the smooth transfer of concrete mix between the conveyor segment 32 and the conveyor segment 54. The transfer apparatus 63 may be of the type similar to that disclosed in U.S. Pat. Re. 26,347, which is incorporated herein by reference. As described in that patent, the transfer apparatus 63 may include a funnel (not shown) an inclined chute (not shown), and a fixed hood (not shown) on the discharge end 52 of the conveyor segment 32. The transfer apparatus 63 permits rotation of the conveyor segment 54 in a complete circle about the discharge end of the conveyor segment 32.

Figure 2:
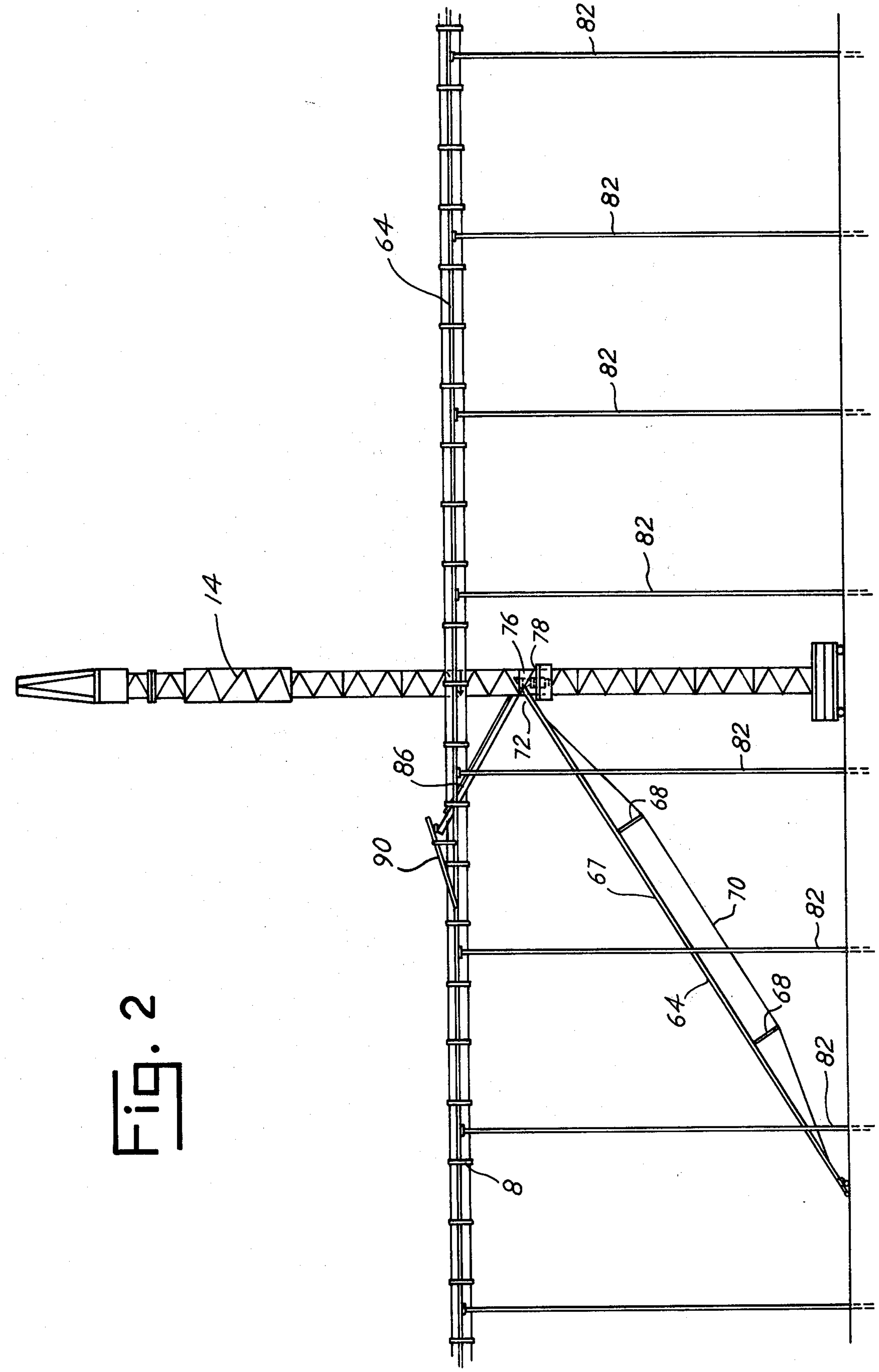
FIG. 2 is an end view of the preferred embodiment of FIG. 1.
Figure 3:
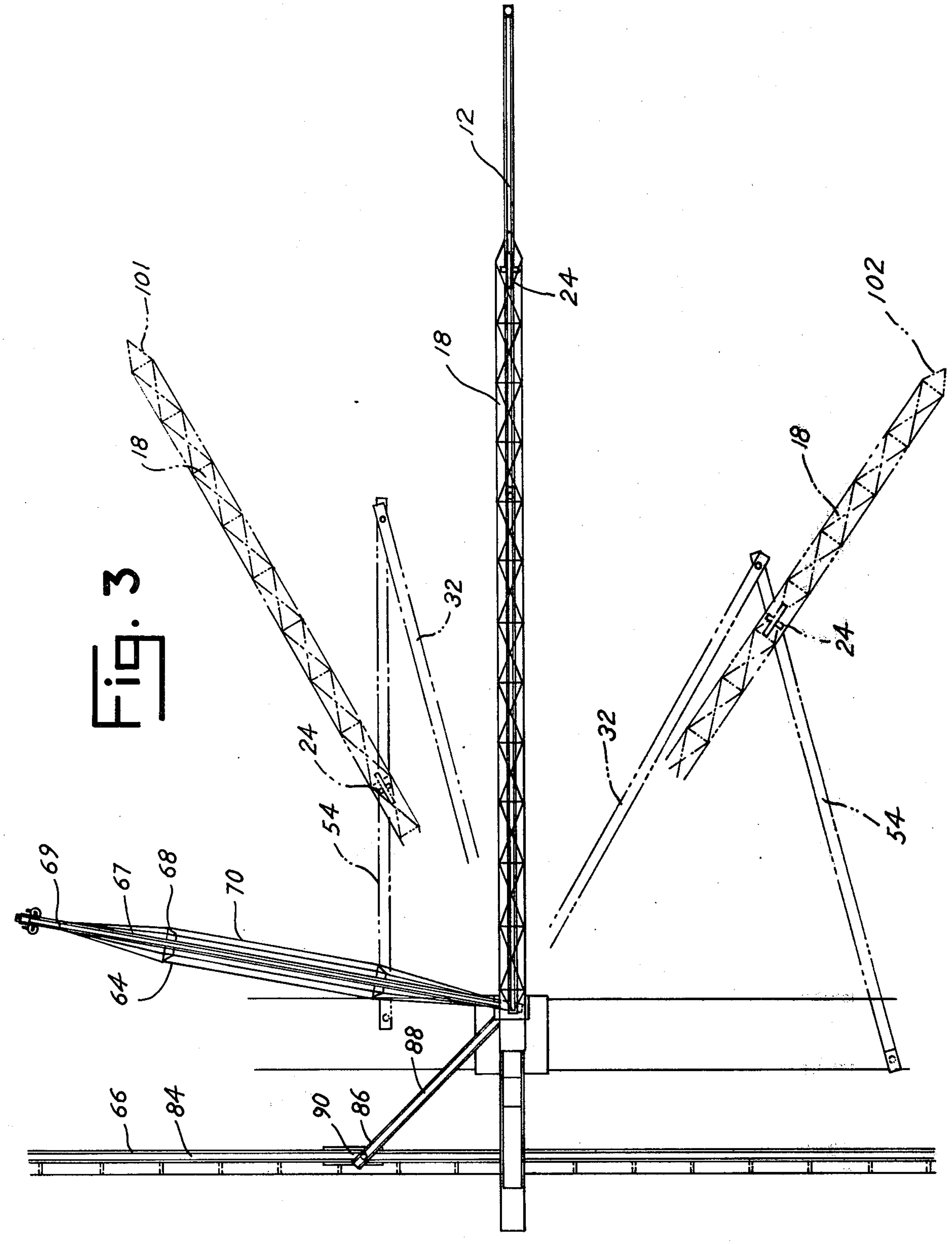
FIG. 3 is a top view of the embodiment of FIG. 1 illustrating the boom and discharge conveyor thereof in a plurality of rotated positions.

Referring to FIGS. 2 and 3, the discharge conveyor 12 may be supplied by a first supply conveyor 64 or a second, alternative supply conveyor 66 or other conventional means. The first supply conveyor 64 comprises a conveyor frame 67, support braces 68, and support cables 70 which cooperate to prevent buckling of the frame 67. An endless conveyor belt 69 passes concrete mix from a concrete supply truck (not shown) to the discharge end 62 of the first supply conveyor 64. The concrete mix then passes through a discharge funnel 76 down through a chute 78 and onto the supply end 36 of the discharge conveyor segment 32.

Alternatively, the second supply conveyor 66 comprises a main conveyor frame 80, upright support braces 82 and a main conveyor belt 84. A supply conveyor boom 86 having a belt 88 and a traveling tripper 90 conveys concrete mix from the main conveyor belt 84 to the discharge funnel 76.

As shown in FIG. 3, the conveyor 12 is capable of being moved to a multitude of positions for placing the concrete mix. With the trolley 24 in its outermost position along the jib boom 18, the jib boom 18 can be swung to position the discharge point of the conveyor 12 at any point along the arc of the circle traced by the swing of the jib boom 18. By driving the trolley 24 back from the outer end of the jib boom 18 and thereafter swinging the jib boom 18, the discharge end of the conveyor 12 can be positioned at any point along arcs of progressively smaller circles. As shown by the phantom outlines 101 and 102 in FIG. 3, when the trolley 24 is moved back from the extreme end of the jib boom 18, the outer discharge conveyor segment 54 pivots about the discharge end 52 of the inner discharge conveyor segment 32 to follow the trolley 24. To reduce the stress caused by the skewing of the outer discharge conveyor segment 54 away from alignment with the jib boom 18, a joint (not shown) may be included along the main support cable 30.

The crane 10 thus performs all placing functions necessary to place concrete mix throughout a substantially semicircular concrete pour area. As shown in FIG. 1, to place concrete at a variety of elevations, the conveyor 12 may be raised or lowered by extending or retracting the cables 42,44 and the main support cable 30.

In a commercial embodiment, this apparatus utilizes eighteen inch wide conveyors having a length of one hundred twenty-five feet each as conveyor segments 32 and 54, a crane 10 having a capacity of two million, five hundred sixty thousand foot-pounds and a jib boom 18 of length one hundred eighty-seven feet. The fixed point 38 where the supply end 36 of the inner discharge conveyor segment 32 is secured to the face 40 of the tower 14 is preferably located about eighty feet above ground level. Elevation and lowering of the conveyor 12 to an angle of 30° from the horizontal positions 103,104 shown in FIG. 2 results in a useful range of discharge heights from slightly below ground level up to 200 feet and more.

From the foregoing, it should be apparent to those skilled in the art that changes or modifications could be made in the design of the apparatus described herein. Thus, the scope of the invention claimed should be measured by the appended claims, rather than the foregoing description of the preferred embodiment. All changes which come within the range of equivalency of the claims are intended to be embraced therein.

What I claim is:

1. An apparatus for conveying a flowable semi-fluid mass to a distant point comprising, in combination:

a first elongated and substantially upright support member;

a second elongated and outwardly extending support member having a first end section and a second end section;

first pivot means for pivotally connecting said first end section of said second support member to said first support member for pivoting about at least a substantially vertical axis;

elongated and articulated discharge conveyor means for conveying said flowable semi-fluid mass to said distant point, said conveyor means having a first conveyor means segment, a second conveyor means segment and a second pivot means for pivotally connecting said first conveyor means segment to said second conveyor means segment for pivoting about at least a substantially vertical axis, said second conveyor means segment having an end and a discharge point thereon;

third pivot means for pivotally connecting said first conveyor means segment to said first support member for pivoting about at least a substantially vertical axis;

first means for supporting said first conveyor means segment from said first support member;

second means for supporting said second conveyor means segment; and means for movably mounting said second support means to said second support member for linear movement thereof along at least said second end section thereof;

whereby said distant point may be varied by pivoting said second support member and moving said movable mounting means to position said discharge point.

2. An apparatus as claimed in claim 1 further including means for raising and lowering said second support means, thereby raising and lowering said second conveyor means segment.

3. An apparatus as claimed in claim 1 wherein said second pivot means pivotally connects said first conveyor means segment to said second conveyor means segment for pivoting about a substantially vertical axis and about a substantially horizontal axis.

4. An apparatus as claimed in claim 1 wherein said second support means includes a secondary cable having two spaced ends attached along said second conveyor means segment and a main cable slidably attached to said secondary cable.

5. An apparatus as claimed in claim 1 wherein said first support means includes at least one cable and said first conveyor means segment is connected by said first pivot means for pivoting about a substantially vertical axis and about a substantially horizontal axis, said apparatus further comprising means for extending said cable to pivot said first conveyor means segment about said horizontal axis.

* * * * *